United States Patent [19]
Fodali

[11] 3,807,530
[45] Apr. 30, 1974

[54] AIR TOOL OILER
[75] Inventor: Adolph Fodali, Lake Hiawatha, N.J.
[73] Assignee: S & G Tool Aid Corp., Newark, N.J.
[22] Filed: June 14, 1972
[21] Appl. No.: 262,516

[52] U.S. Cl............................................. 184/55 A
[51] Int. Cl............................................. F16n 7/30
[58] Field of Search............... 184/55 R, 55 A, 56 A

[56] References Cited
UNITED STATES PATENTS
| | | | |
|---|---|---|---|
| 3,261,426 | 7/1966 | Kuhlman | 184/55 A |
| 2,352,826 | 7/1944 | Finch | 184/55 A |
| 2,430,361 | 11/1947 | O'Farrell et al. | 184/55 A |
| 2,308,773 | 1/1943 | Norgren et al. | 184/55 A |
| 1,834,172 | 12/1931 | Osgood | 184/55 A |
| 3,682,274 | 8/1972 | Bennett | 184/55 A |

*Primary Examiner*—Manuel A. Antonakas

[57] ABSTRACT

An air line oiler for insertion in compressed air lines to supply lubricating oil thereto comprising as a first piece an air conduit with means at each end thereof for securing said conduit to the air line and with an opening in the wall thereof fitted with valve means for controlling the oil flow; and as a second piece a wall sized to radially surround and be spaced from said air conduit and to extend to opposite axial ends of said wall opening to define an oil reservoir between said first and second pieces; and cooperating means operating on said first and second pieces to facilitate their engagement to one another.

9 Claims, 2 Drawing Figures

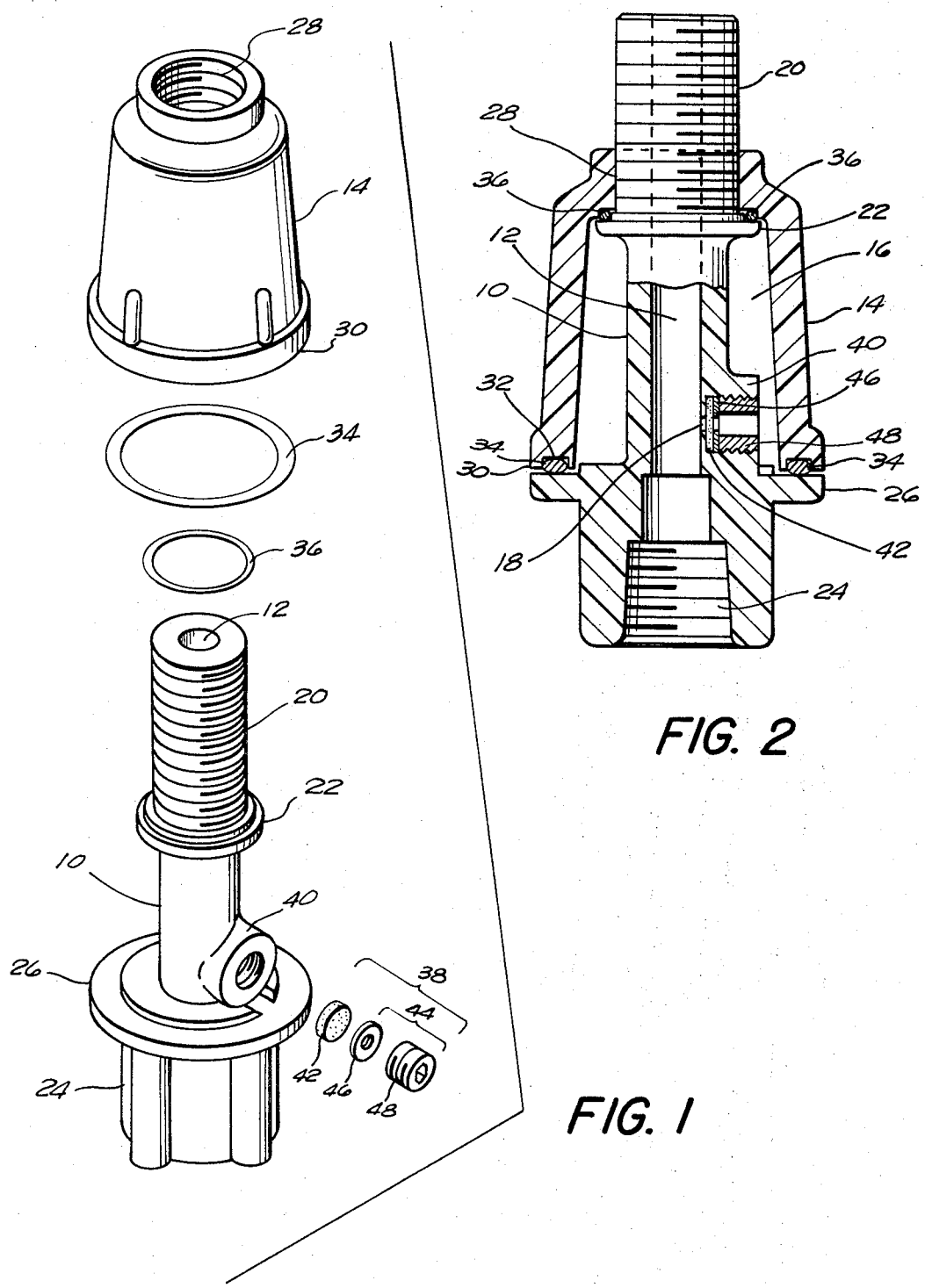

AIR TOOL OILER

This invention relates to a simple, compact and economical air line line oiler, particularly adapted for insertion in compressed air lines.

It is customary in the art to supply lubricant to pneumatic tools and the like by entraining lubricant in the compressed air that provides motive power for the tool. Such entraining is generally effected by a lubricator interposed in the air line between the source of compressed air and the tool or other device to be lubricated. While numerous air line oilers are known to those skilled in the art, they are generally complex in construction and hence costly, often multi-component assemblies which require complex valve systems in order to monitor the introduction of oil into the air line. In addition, the prior art assemblies frequently do not provide the regularity and uniformity of flow which is generally required when introducing oil into compressed air lines.

The object of the invention is to provide a simple and efficient air line oiler for supplying lubricating oil to compressed air lines used in connection with pneumatic tools and the like.

Another object is to provide an air line oiler which automatically responds to an air demand in the line by establishing and maintaining a regular and uniform oil flow.

Still another object is to provide an oiler which introduces the oil as a fine vapor or mist.

A further object is to provide an oiler wherein the component parts are combined so as to form an oil reservoir which can be tightly sealed during oil storage and which can be readily opened in order to allow for replenishment of the oil.

Still a further object is to provide an oil reservoir for the oiler which has light transmissive walls in order that the oil level therein is readily ascertainable.

Various other objects and advantages of this invention will become apparent from a reading of the disclosure that follows hereinafter.

I have now discovered a novel air line oiler which exhibits a simple and compact construction. Thus, the oiler of this invention comprises inner and outer parts which are combined to form an air passage having an oil reservoir in communication therewith. The inner part of the oiler comprises an air conduit with means at each end thereof for engaging the compressed air line. The conduit wall also has an opening therethrough which is fitted with valve means for controlling the flow of oil into the air conduit. The outer part comprises a wall which surrounds and is spaced from said inner part and which extends to the opposite axial ends of said wall opening in order to define an oil reservoir between said inner and outer parts. Cooperating means operate on said inner and said outer parts in order to facilitate the combining of these parts to form the oiler of the invention.

It is thus seen that the instant oiler is distinguishable from the prior art oilers in that it does not require the presence of a multiplicity of component parts nor does it require utilization of a complex valve system. Rather, the oiler contains only two basic component parts which are utilized in conjunction with a simple oil-feed mechanism which readily responds to the air demand in the air passage and which introduces the oil into the air line in a regular and uniform manner. Furthermore, the reservoir of the instant oiler engages the inner air conduit in a manner which insures leak-proof operation as well as ready removability to allow for oil replenishment. Inasmuch as the reservoir is externally positioned, the use of light transmissive material in the manufacture thereof will enable the practitioner to readily ascertain the oil level in the oiler without opening the assembly.

To the accomplishment of the above, the present invention relates to an air line oiler as defined in the appended claims and as described in the specification, together with the accompanying drawings in which:

FIG. 1 is an exploded, isometric view of the oiler showing its component parts and the relationship of these parts; and FIG. 2 is an enlarged cross-sectional view of the assembled oiler.

The air line oiler of the present invention consists of two principal parts, the inner part which defines the air conduit and the outer part which engages the inner part to provide an oil reservoir surrounding said air conduit. The wall defining the air conduit has means at each end thereof to engage the compressed air line. The wall also contains an opening which is located between the means for engaging the compressed air lines and which serves as the entrance for the oil being introduced into the air conduit from the reservoir. The wall opening generally connects with a bore which houses the valve means for controlling the oil flow into the air conduit.

The outer part comprises a wall which is sized to radially surround and be spaced from said inner part and to extend to opposite axial ends of the wall opening so as to define an oil reservoir which is in communication with said air passage. The inner and outer parts contain or are contacted by cooperating means which are located on opposite axial ends of said wall opening to enable the respective parts to engage one another in such a manner that the reservoir can be tightly sealed during operation of the oiler and readily opened when replenishment of the oil supply therein is required.

The specific and preferred embodiment of the air line oiler construction of this invention, here illustrated, comprises an inner wall 10 which defines an air conduit or passage 12. The wall 10, which is generally in tubular shape, contains an opening 18 therein which serves as the oil entryway. Wall 10 also consists of an externally threaded end 20 which serves to engage the compressed air line (not shown). At the end of this threaded section 20 is an integral flange 22. The other end of air conduit wall 10 exhibits a preferably internally threaded portion 24, also serving to engage the compressed air line, which ends in a second integral flange 26, flange 26 being wider than said flange 22. Threaded sections 20, 24 are located on opposite axial ends of wall opening 18.

Wall 14 which combines with air conduit wall 10 to define the oil reservoir 16, contains an internally threaded end portion 28 and an opposite non-threaded end section 30. In securing outer wall 14 to air conduit wall 10, the internally threaded portion 28 engages the externally threaded end 20 of wall 10. Inasmuch as flange 26 is larger in width than flange 22, non-threaded end 30 of reservoir wall 14 freely passes over flange 22 and continues until it engages 26 in order to seal this end of the oil reservoir 16. Simultaneously, the internally threaded portion 28 of reservoir wall 14 engages flange 22 to effect a tight seal at this end of reservoir 16. When conduit wall 10 and reservoir wall 14 are combined in this manner it is seen that the reservoir wall 14 radially surrounds and is spaced from conduit wall 10 to define oil reservoir 16. It is to be noted that these various cooperating means are positioned on opposite axial ends of wall opening 26 in order to properly locate reservoir 16 in relation to wall opening 26 and air conduit 12.

The leakproof nature of the juncture between flange 22 and threaded section 28 and the juncture between flange 26 and non-threaded section 30 can be further assured by inserting sealing rings, i.e., gaskets, therebetween. For example, gasket 36 can be inserted between flange 22 and threaded section 28 in order to effectively seal this end of reservoir 16. Correspondingly, gasket 34 may be positioned between flange 26 and non-threaded section 30 in order to seal this opposing end of oil reservoir 16. It is seen that comparable results can also be obtained by recessing the gasket in either the flange or the end section which engages the flange. For example, non-threaded section 30 of reservoir wall 14 can be provided with an annular recess 32 which houses gasket 34. The seating of non-threaded section 30 against flange 26 thus also insures the formation of a leak-proof juncture.

Reservoir wall 14 is generally in bell or trapezoidal shape in order to properly engage the air conduit wall 10 and be sufficiently spaced therefrom to provide adequate oil storage capability. Other shapes are, however, equally applicable providing that they meet the aforementioned requirements. Reservoir wall 14 is preferably prepared from a light transmissive material such as a clear molded plastic or glass in order that the level of oil in the reservoir can be readily observed without the necessity of opening the entire assembly. Air conduit wall 10 may likewise be prepared from molded plastics, glass or metal.

A variety of valve means well known to the practitioner skilled in the art may be utilized to control the flow of oil into the air conduit 12. Means for securing the valve means can also best be determined by the practitioner. The illustrated housing for valve means 38 is bore 40 which extends from wall opening 18 into reservoir 16. The preferred valve means for purposes of this invention comprises a microporous filter 42 which covers wall opening 18 and which is larger than said opening 18 in order to insure proper control of the oil flow as well as to prevent seepage around the edges of filter 42. The microporous filter 42 is held in fixed position in bore 40 by means of retaining assembly 44. The retaining assembly 44 which is illustrated in the drawings, comprises a washer 46 placed in face to face contact with filter 42 and an externally threaded hollow shaft 48 which engages bore 40 in order to hold the filter 42 and the washer 46 in fixed position. It should be noted that the retaining assembly 44 may be virtually of any construction desired by the practitioner, such as a hollow plug wedged into said bore 40, it merely being required that the channel between the oil reservoir 16 and the air conduit 12 remain open for the flow of oil therebetween.

Microporous filters are well known to those skilled in the art. The thickness and porosity of the selected filter will depend on the viscosity of the oil, as well as on the amount of oil which is to be introduced into the compressed air line. Such microporous filters are generally prepared from paper, polymeric film compositions or non-woven fabrics with typical porosities ranging from about 0.10 to 0.60 microns.

Variations may, of course, be made in the above-described assembly. For example, wall 14 which is depicted as containing an internally threaded end portion 28 and an opposite non-threaded end section 30, may be constructed so that both end sections are non-threaded. In this instance, outer wall 14 is secured to air conduit wall 10 by means of an extraneous threaded member, such as a nut and the like, which engages the externally threaded end 20 of wall 10 and presses against wall 14 so as to effect tight seals at the respective junctures of wall 10 and wall 14. Furthermore, oil reservoir 16 may be provided with an inlet port and plug fitted into the wall 14 thereof for the purpose of facilitating the entry of the oil into reservoir 16. In addition, preferred valve means 38 may be provided with a porous mesh layer positioned between the microporous filter 42 and the retaining means 44 in order to protect the filter and prevent the rupture thereof.

Operation of the air tool oiler as shown in FIGS. 1 and 2 proceeds as follows: With the parts in assembled position, as indicated in FIG. 2, and with the oiler connected in series in the air line, with air line ends screw-connected to the oiler at 20 and 24 respectively, and no air demand downstream from the oiler, equalization of the air pressure between the tubular air conduit and the oil reservoir is achieved by the passage of air through the valve means into the reservoir so as to build up equal pressure within the oil reservoir. With the occurrence of an air demand downstream from the oiler, the pressure within the air conduit drops slightly due to the velocity of the air with the result that the oil is forced through the valve into the air conduit and carried directly to the machine or tool for proper lubrication thereof. Under all conditions of operation in response to an air demand, the air pressure on the surface of the oil in the reservoir is higher than the air pressure existing in the air conduit so that oil in the form of a spray or fine mist, is delivered into the air conduit. As previously indicated, the rate of oil delivery will depend on the viscosity of the oil, the characteristics of the valve and the velocity of the air. With cessation of the air demand, oil delivery ceases and slight amounts of air once again pass into the oil reservoir in order to equalize the pressure.

The oiler of this invention is seen to exhibit substantial ease, efficiency and economy of use. Thus, the combination of the light transmissive walls of the reservoir and its exterior positioning on the oiler enables the practitioner to readily ascertain the oil level therein. When additional oil is needed, it is merely necessary to partially unscrew the reservoir, replenish the oil and secure the reservoir. The economical benefits are derived from the fact that only two essential components are required, that these component parts can be readily made to shape using molded plastics and that the same threaded means 20 is utilized to engage the reservoir wall 14 and to secure the compressed air line to the oiler.

Summarizing, it is seen that this invention provides a simple and efficient air line oiler which is particularly adapted for use in the air supply line of air operated tools.

While the invention has been described in terms of the specific embodiments herein, it should be apparent that variations thereof may be developed without departing from the spirit or scope of the invention.

I claim:

1. An air line oiler comprising an inner part and an outer part, said inner part comprising a wall defining a passage and means at each end of said passage for securing said inner part to ends of an air line, said wall having an opening there-through fitted with valve means for controlling the flow of oil into said passage;

said outer part comprising a wall sized to radially surround and be spaced from said inner part and to extend to opposite ends of said wall opening, thereby to define an oil-receiving chamber between said inner and outer parts, said outer part being releasable from its position on said inner part without disruption of the integrity of the air line; and cooperating means operating on said inner and outer parts respectively located on opposite axial ends of said wall opening effective to engage one another, to releasably retain said outer part in position on said inner part, and to seal said chamber against the escape of oil therefrom; said cooperating means comprising first and second flanges on said inner part engaged by said outer part and located on opposite axial ends of said wall opening, and an externally threaded section on said inner part having a first portion engaging an internally threaded section on said outer part to seat said outer part against said first and second flanges and a second portion providing the means for securing said inner part to an end of the air line.

2. The oiler of claim 1, wherein a sealing ring is positioned between said first flange and said outer part.

3. The oiler of claim 1, wherein a sealing ring is positioned between said second flange and said outer part.

4. The oiler of claim 1, wherein said first flange is wider than said second flange to enable said outer part to freely pass over said second flange and engage said first flange.

5. The oiler of claim 1, wherein said externally threaded section is located on the end of said wall opening axially opposite to the end on which said first flange is located.

6. The oiler of claim 5 wherein said second flange is positioned between said externally threaded section and said wall opening.

7. The oiler of claim 6, wherein said second flange is smaller in width than said first flange to enable said outer part to freely pass over said second flange and engage said first flange.

8. The oiler of claim 1, wherein said valve means comprises a microporous filter covering said wall opening and filter retaining means affixed thereto for retaining said filter in fixed position.

9. The oiler of claim 1, wherein said outer part is removable from said inner part while said inner part is secured to ends of the air line.

* * * * *